United States Patent [19]
Aritake et al.

[11] Patent Number: 5,774,589
[45] Date of Patent: Jun. 30, 1998

[54] IMAGE PROCESSING SYSTEM

[75] Inventors: Hirokazu Aritake; Masato Nakashima; Satoshi Maede; Manabu Ishimoto, all of Kawasaki, Japan

[73] Assignee: Fujitsu Limited, Kanagawa, Japan

[21] Appl. No.: 525,030

[22] Filed: Sep. 8, 1995

[30] Foreign Application Priority Data

Feb. 14, 1995 [JP] Japan ................................ 7-025495

[51] Int. Cl.⁶ ...................................................... G06K 9/36
[52] U.S. Cl. .............................................................. 382/232
[58] Field of Search ................................. 382/154, 173, 382/232, 234, 242, 243, 284, 285, 318; 358/42, 47, 48, 50, 51, 52, 153, 159, 201

[56] References Cited

U.S. PATENT DOCUMENTS

| | | | |
|---|---|---|---|
| 4,148,062 | 4/1979 | Kamin | 382/318 |
| 4,661,986 | 4/1987 | Adelson | 382/154 |
| 4,797,942 | 1/1989 | Burt | 382/284 |
| 4,982,438 | 1/1991 | Usami et al. | 382/154 |
| 5,140,416 | 8/1992 | Tinkler | 382/173 |
| 5,297,222 | 3/1994 | Mori et al. | 382/318 |
| 5,298,697 | 3/1994 | Suzuki et al. | 382/284 |
| 5,325,449 | 6/1994 | Burt et al. | 382/284 |

FOREIGN PATENT DOCUMENTS

| | | |
|---|---|---|
| 2 260 674 | 4/1993 | United Kingdom . |
| WO 92/15176 | 9/1992 | WIPO . |

OTHER PUBLICATIONS

"Data Compression and Interpolation of Multi–View Image Set", Fujii et al, *IEICE Transactions on Information and Systems,* vol. E77–D, No. 9, Sep. 1, 1994, pp. 987–995.

*Primary Examiner*—Jose L. Couso
*Attorney, Agent, or Firm*—Nikaido, Marmelstein, Murray & Oram LLP

[57] ABSTRACT

An image processing system is composed of a control unit for outputting a synchronizing signal, an input unit for inputting a plurality of images in which objects are viewed from various directions respectively, an image data storage unit for synchronizing the plurality of image data inputted from the input unit on the basis of the synchronizing signal inputted from the control unit and storing them continuously, a data compression unit for compressing the plurality of image data inputted from the image data storage unit by using a correlation among the image data and an interface unit for multiplexing the plurality of compressed data inputted from the data compression unit and outputting the multiplexed data to an external device.

13 Claims, 11 Drawing Sheets

IMAGE PROCESSING SYSTEM

BACKGROUND OF THE INVENTION

The present invention relates to an image processing system, to be more specific, the present invention relates to a system for compressing and restoring a plurality of images in real time.

Figure 1:
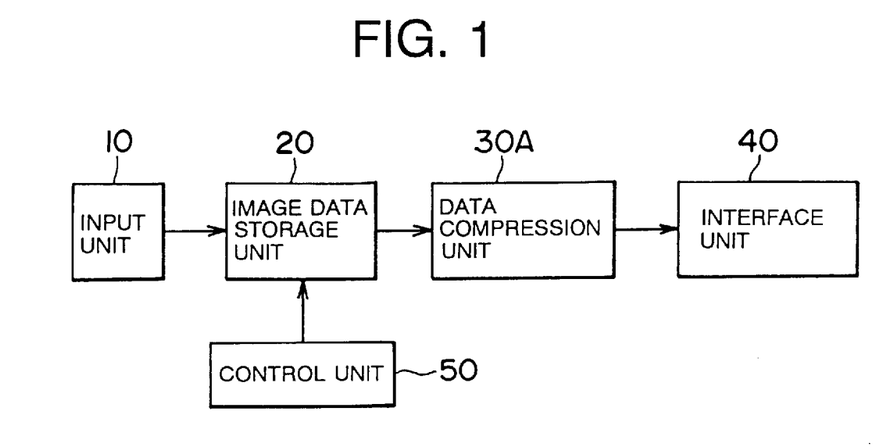
FIG. 1 is a principle construction diagram (1) of an image processing system of the present invention.
Figure 2:
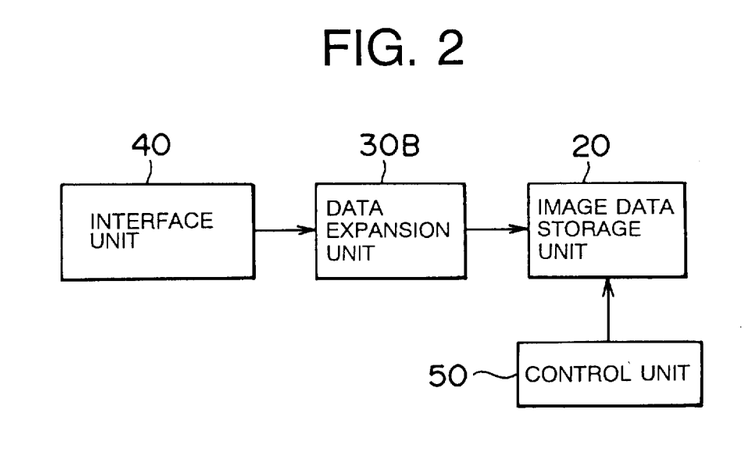
FIG. 2 is a principle construction diagram (2) of an image processing system of the present invention.
Figure 3:
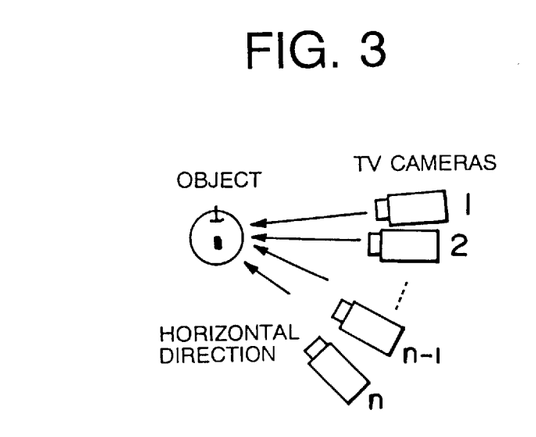
FIG. 3 is a conceptual diagram indicating a state in which an object is photographed.

In a polarizing spectacle method and a lenticular stereoscopic display method, as shown in FIG. 3, images (a plurality of two-dimensional images) in which the objects shown in FIG. 3 are viewed from a plurality of directions are synchronized by a plurality of recording devices to execute a recording and a replaying.

Accordingly, a problem that a physical size and a weight of the device will be increased occurs, since the device has an exclusive device for recording each of the images.

Besides, a plurality of recording devices (tapes and the like) are required, and a problem that an intricate circuit for synchronizing motors of each recording device will be required and the price of the device will be high also occurs.

Further, transmission lines corresponding to the number of cameras and recording devices are used. Accordingly, a problem that an intricate device for executing a synchronization among the transmission lines will be required and the price of the device will be high also occurs when the image data are transmitted.

SUMMARY OF THE INVENTION

A subject of the present invention is to provide an image processing system which can be easily synchronized and whose degree of freedom is high and whose price is low.

The image processing system of the present invention comprises a control unit 50, an image data storage unit 20, a data compression unit 30A and an interface unit 40 as required components so as to solve the above-mentioned subject.

(CONTROL UNIT 50)

The control unit 50 outputs a synchronizing signal.

(INPUT UNIT 10)

In the input unit 10, a plurality of images in which each of objects is viewed from various directions are input.

In the input unit 10, for instance, the images can be input from a CCD image sensor, an ITV (industrial television) camera, a solid image camera and the like. Besides, the images also can be input from such recording devices as a VTR and a laser disk. Further, the image data can be input from a computer and the like.

(IMAGE DATA STORAGE UNIT 20)

The image data storage unit 20 synchronizes the plurality of image data input by the input unit 10 on the basis of the synchronizing signal input from the control unit 50 and stores them continuously.

For instance, a frame buffer, a RAM (Random Access Memory), a semiconductor memory, a magnetic disk memory, a magnetic tape unit, a M/O (Magnet Optical; photoelectro-magnetic disk unit) and an I/C card and the like can be used as the image processing unit 20.

(DATA COMPRESSION UNIT 30A)

The data compression unit 30A compresses the plurality of image data input from the image data storage unit 20 by using a correlation among the image data.

(INTERFACE UNIT 40)

The interface unit 40 multiplexs the plurality of compressed data input from the data compression unit 30A and outputs them to an external device. The external device means, for instance, a recording device or a communication device connected by wire or by wireless.

According to the image processing system of the present invention, the plurality of image data input by the input unit 10 are synchronized with and stored in the image data storage unit 20 continuously. Then, the plurality of stored image data are data-compressed by the data compression unit 30A by using a correlation among the image data. Further, the plurality of compressed data are multiplexed by the interface unit 40 to be output to the external device.

BRIEF DESCRIPTION OF THE DRAWINGS

FIG. 4 FIGS. 4(A) and 4(B) are construction diagrams of the first embodiment.

The construction of FIG. 6 is a construction when a switching circuit is not installed in FIG. 5.

FIGS. 7 (A), 7(B), 7(C) and 7(D) are explanatory diagrams (1) of a compression processing of the first embodiment.

DETAILED DESCRIPTION OF THE PREFERRED EMBODIMENT

The concrete embodiments of the present invention will be described as follows.

THE FIRST EMBODIMENT

Construction Of The First Embodiment

Although a compression and an expansion of the image data are executed with one circuit in the image processing system of the first embodiment, the constructions of the image processing system will be described by separating the construction when the data is compressed from the construction when the data is expanded so as to prevent the description from becoming ambiguous.

(CONSTRUCTION WHEN THE DATA IS COMPRESSED)

Figure 4A:
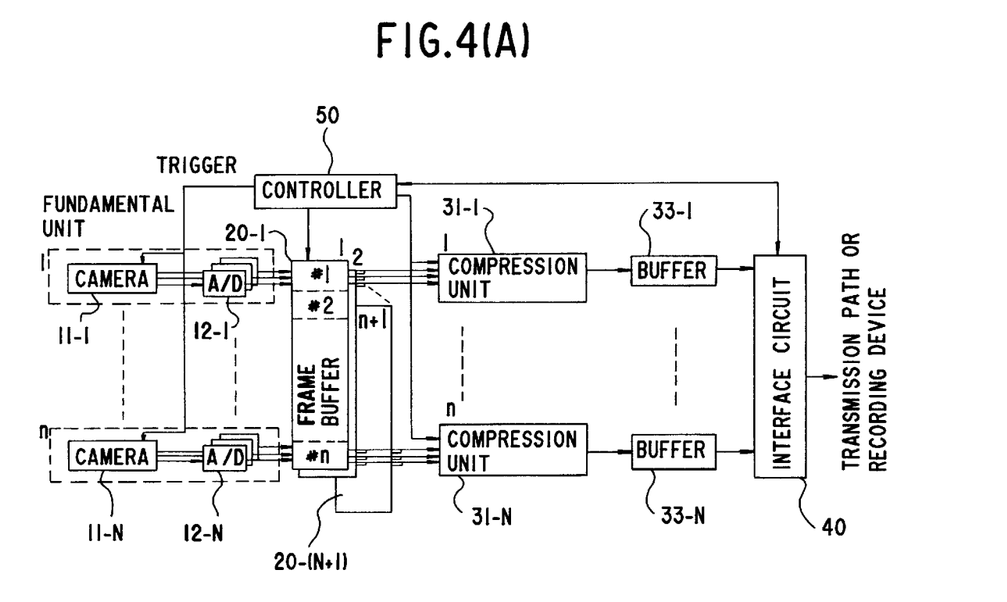

FIG. 4 (a) is a construction diagram of the image processing system when the data is compressed.

As shown in FIG. 4, the image processing system comprises N pieces of cameras 11-1–11-N, N pieces of A/D converters 12-1–12-N, (N+1) pieces of frame buffers 20-1–20 (N+1), a controller 50, N pieces of compression units 31-1–31-N, N pieces of buffers 33-1 –33-N and an interface circuit 40.

Each of the components will be described as follows.

[Cameras 11-1–11-N]

The cameras 11-1–11-N photographs the object from a plurality of horizontal directions in the same way as the case of the prior art shown in FIG. 3. In this case, each of the cameras is placed in a equal vertical position.

Besides, each of the cameras outputs the image data which were synchronized with one another analogically, since the cameras 11-1–11-N inputs the identical image uptake trigger signal from the controller 50.

The cameras which output the image data digitally can be substituted for the cameras 11-1–11-N.

Further, in the following description, the images which were photographed by the cameras 11-1–11-N will be described as #1#N respectively.

[A/D Converters 12-1–12-N]

The A/D converters 12-1–12-N are connected to the cameras 11-1–11-N, and converts three kinds of analog signals R, G and B input from the cameras 11-1–11-N into the digital signals.

The A/D converters 12-1–12-N will not needed, if the cameras 11-1–11-N output the image data digitally.

[Frame Buffers 20-1–20 (N+1)]

Figure 5:
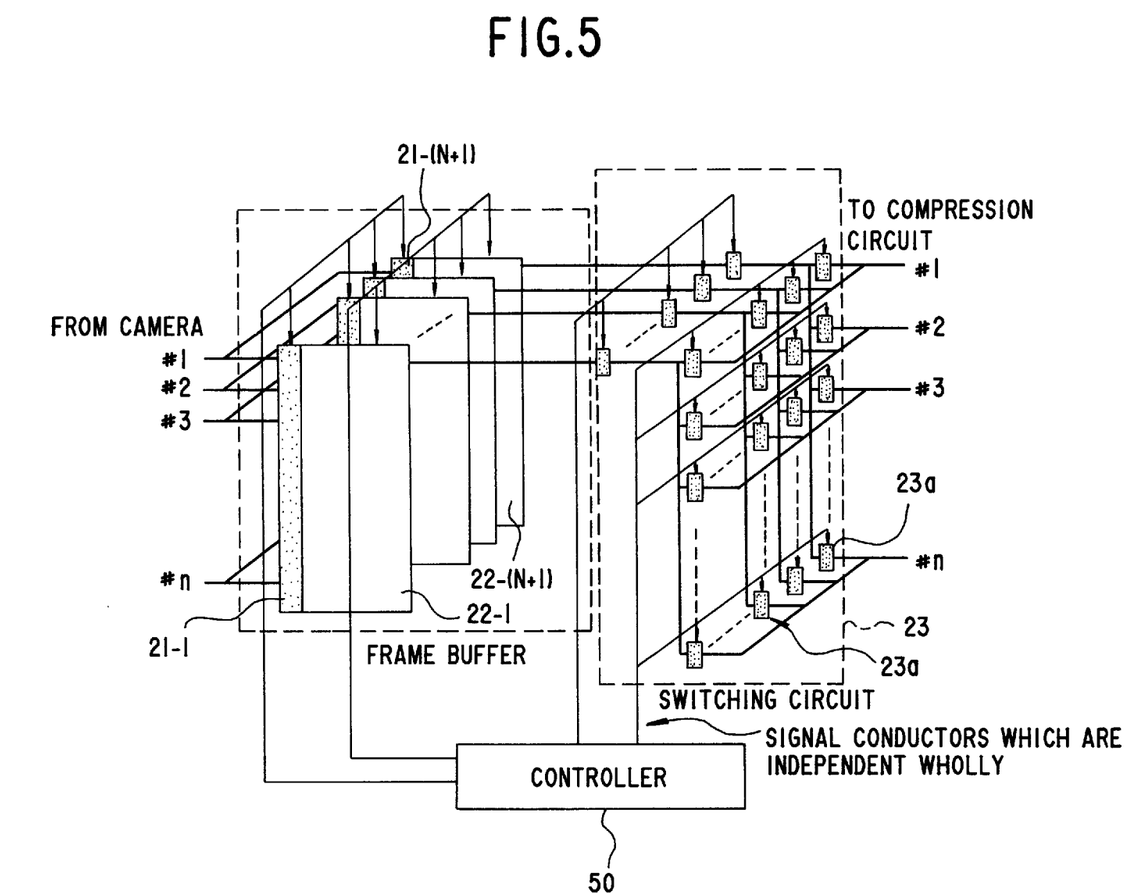
FIG. 5 is a detailed construction diagram (1) of a frame buffer and its peripheral circuit.

As shown in FIG. 4, the frame buffers 20-1–20 (N+1) are connected to the A/D converters 12-1–12-N and the controller 50, and has (N+1) pieces of banks 22-1–22 (N+1), as shown in FIG. 5. The banks 22-1–22 (N+1) has a capacity for storing N sheets of image data per one piece at the same time, and interlace-converts and noninterlace-converts the images output from the A/D converters 12-1–12-N to store them after the banks are switched per frame in order by the controller 50. One frame of image in which the object is viewed from the directions of N simultaneously is stored within each of the banks.

FIG. 5 is a detailed construction diagram of the frame buffers 20-1–20 (N+1) and the peripheral circuits. As shown in FIG. 5, the frame buffers 20-1–20 (N+1) are provided with (N+1) pieces of input units 21-1–21 (N+1) which are connected to the controller 50 and are composed of three state buffers. The input units 21-1–21 (N+1) are connected to the banks 22-1–22 (N+1) one by one respectively, and the controller 50 indicates the frame buffers 20-1–20 (N+1) to which the images #1–#N are stored.

The switching circuit 23 for connecting (N+1) pieces of banks to N pieces of compression units is connected to the banks 22-1–22 (N+1). As shown in FIG. 5, the above-mentioned switching circuit 23 is composed of a plurality of matrix switches (three state buffers) 23a, and the controller 50 indicates the frame buffers 20-1–20 (N+1) from which the images are outputted.

Figure 6:
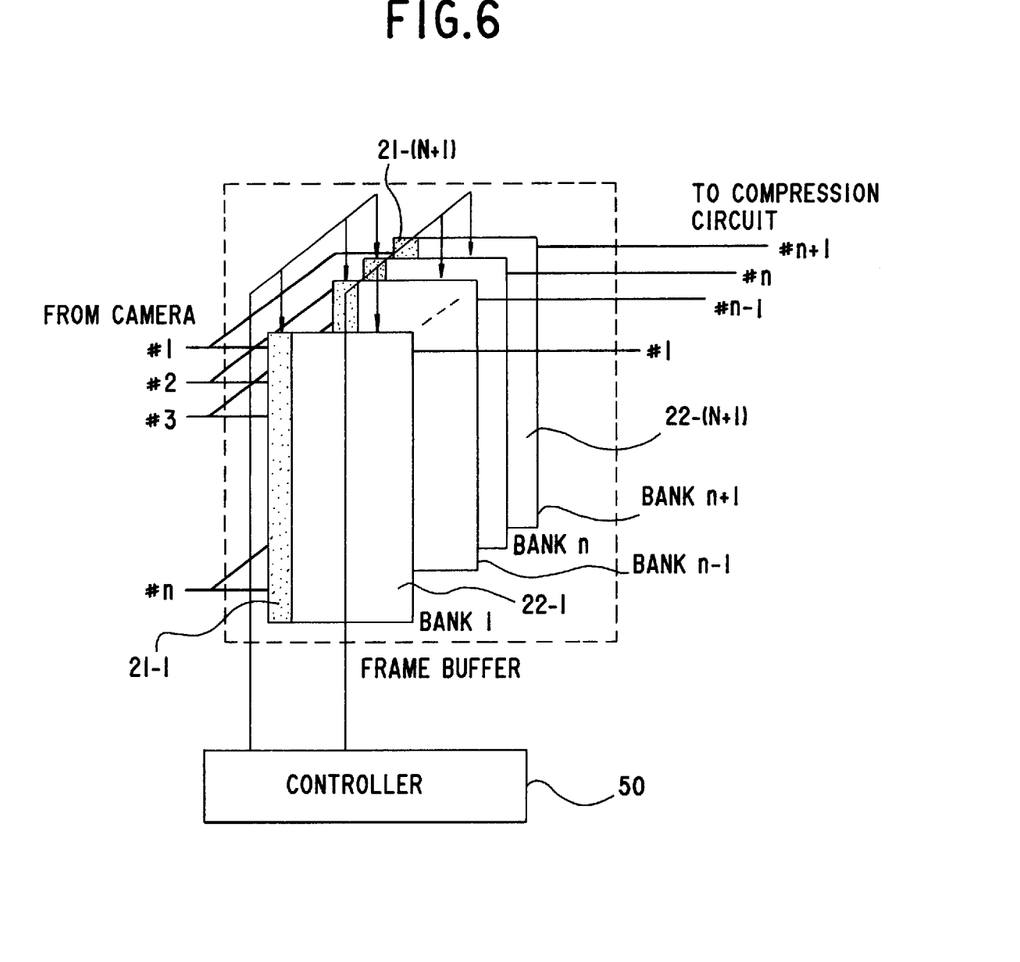
FIG. 6 is a detailed construction diagram (2) of a frame buffer and its peripheral circuit.

Further, the switching circuit 23 will not be needed and the frame buffers 20-1–20 (N+1) and the peripheral circuits can be constructed as shown in FIG. 6, if (N+1) pieces of compression units are installed.

[Compression Units 31-1–31-N]

The compression units 31-1–31-N read out the image data from the frame buffers 20-1–20 (N+1) in order and compresses the image data.

The method for compressing the image data varies depending on whether the compression unit 31-1–31-N are constructed by using a MPEG chip or a JPEG chip.

The compression units 31-1–31-N compresses the data by using a correlation among the frames, when the MPEG chip is used.

For instance, the difference between the images among the cameras is taken and the image data from which the difference is taken are compressed, since the correlation among the frames does not exist when the JPEG chip is used.

[Buffers 33-1–33-N]

The buffers 33-1–33-N are connected to the compression units 31-1–31-N and stores the compressed data outputted from the compression units 31-1–31-N asynchronously so as to synchronize the compressed data in the following interface circuit 40.

[Interface Circuit 40]

The interface circuit 40 is connected to the buffers 33-1–33-N and multiplexs the data input from the buffers 33-1–33-N. Then, the interface circuit 40 adds parameters for transmission and recording to the multiplexed data and outputs them to the unillustrated transmission path and recording unit.

(CONSTRUCTION WHEN THE DATA IS EXPANDED)

Figure 4B:
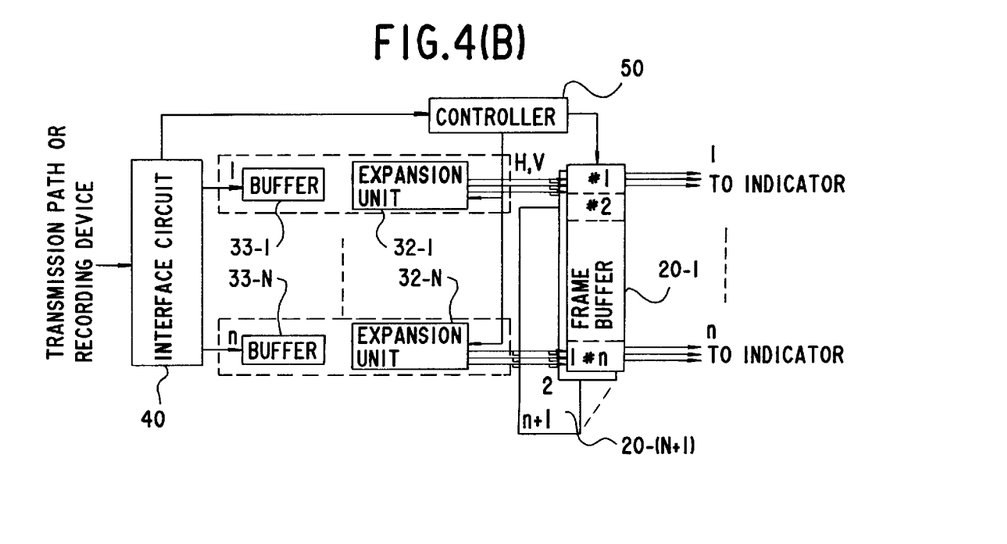

FIG. 4($b$) is a construction diagram of the image processing system when the data is expanded.

As shown in FIG. 4($b$), the image processing system comprises an interface circuit 40, N pieces of buffers 33-1–33-N, N pieces of expansion units 32-1–32-N and frame buffers 20-1–20-(N+1).

Each of the components will be described as follows.

[Interface Circuit 40]

The interface circuit 40 inputs the compressed data which has been multiplexed from the unillustrated transmission path and recording device, and resolves them into N pieces of compressed data.

[Buffers 33-1–33-N]

The buffers 33-1–33-N are connected to the interface circuit 40 and stores the compressed data output from the interface circuit 40 asynchronously so as to synchronize the compressed data in the expansion units 32-1–32-N.

[Expansion Units 32-1–32-N]

The expansion units 32-1 –32-N are connected to the buffers 33-1–33-N and expands the compressed data input from the buffers 33-1–33-N into the image data.

[Frame Buffers 20-1–20-(N+1)]

The frame buffers 20-1–20-(N+1) are connected to the expansion units 32-1–32-N and the controller 50 and has (N+1) pieces of banks 22-1–22-(N+1). The banks 22-1–22-(N+1) has a capacity for storing N sheets of image data per one piece simultaneously.

Then, the frame buffers 20-1–20-(N+1) outputs the stored image data in accordance with a format of the unillustrated indicator.

OPERATIONS OF THE FIRST EMBODIMENT

Then, the operations of the first embodiment will be described. Further, although the following description is related to the compression processing, the expansion processing is executed by executing the compression processing reversely, for instance, by replacing the difference with the sum.

(THE FIRST COMPRESSION PROCESSING)

FIG. 7 is an explanatory diagram of the first compression processing. In the first compression processing, the differences between the reference images and the images which are input in order are compressed one after another.

In FIG. 7, the reference image is indicated by "C". As shown in FIG. 7 (A), the image in the center can be selected as the reference image, or as shown in FIG. 7 (B), the image in the edge can be selected as the reference image. As shown in FIG. 7 (C), the compression units 31-1–31-N will store the images which has been input for the first time as the reference image (#1) and compress the difference between the input images (#2, #3, . . . ) and the reference image (#1) after that, even if the reference image is selected in the above-mentioned either way. Further, "1", "2", . . . and "N" in FIG. 7 (A) and (B) indicate the image photographed by the cameras 11-1–11-N respectively.

FIG. 7 (D) indicates a detailed construction of a compression unit. The compression unit comprises a controller, a reference image buffer, a difference data generating circuit, a switching circuit for switching the data output from the reference image buffer and the data output from a difference data generating circuit and a compression circuit.

Figure 7A:
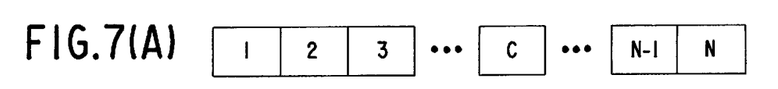
Figure 7B:
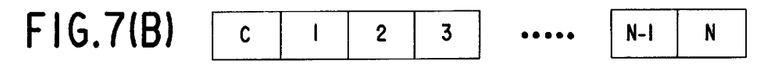
Figure 7C:
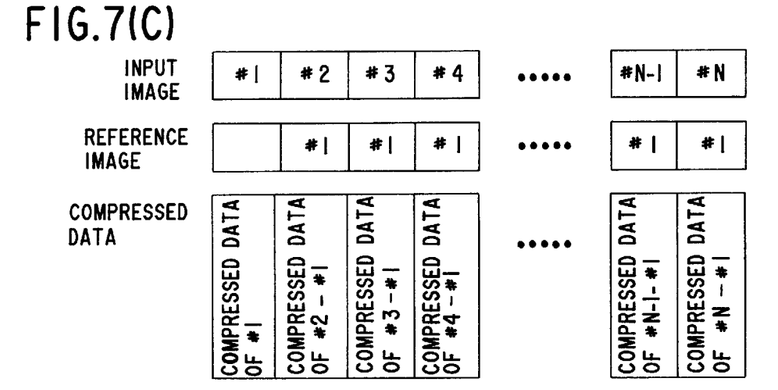
Figure 7D:
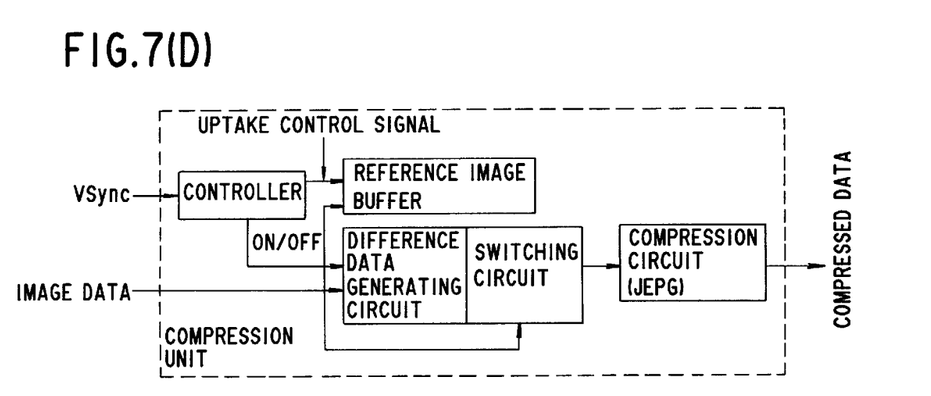

The controller counts Vsync which is a synchronizing signal of frame, writes the image into the reference image buffer when the image is an image which has been transmitted first in the frame, and switches the difference data generating circuit OFF to lead the image data into the compression circuit as it is.

Besides, when the image is not an image which has been transmitted first in the frame, the controller reads out the reference image from the reference buffer in accordance with the input image, and prepares the difference data between the reference image data and the input image to put out the difference data into the compression circuit. The process is continued by the controller until the images stored within each of the banks 22-1–22-(N+1) are out.

(THE SECOND COMPRESSION PROCESSING)

Figure 8A:
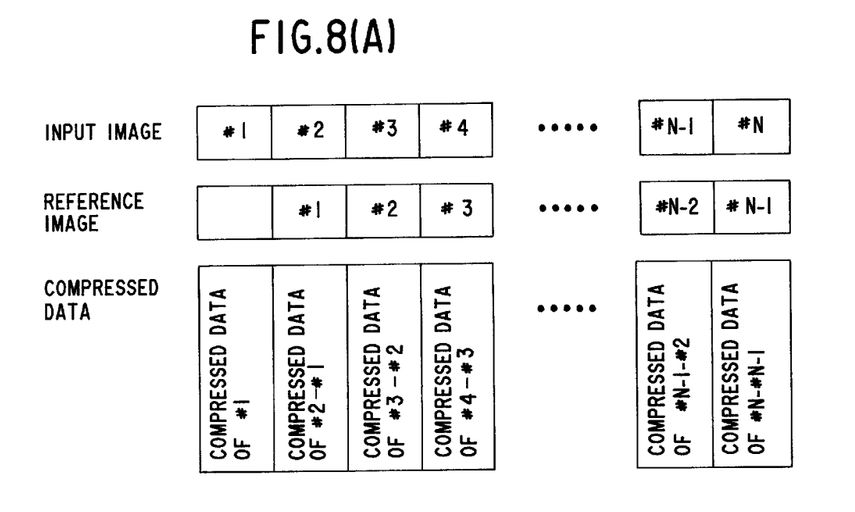
FIGS. 8(A) and 8(B) are explanatory diagrams (2) of a compression processing of the first embodiment.

FIG. 8 is an explanatory diagram of the second compression processing. In the second compression processing, as shown in FIG. 8 (A), the difference between two sheets of input images which are adjacent to one another are compressed one after another. Namely, the reference image is an image which has been input just before the newest input image. As mentioned hereinbefore, an advantage of compressing the differences between the images which are adjacent to one another is the point that the compressibility can be set high since it is expected that the correlation between the two images will be high.

Figure 8B:
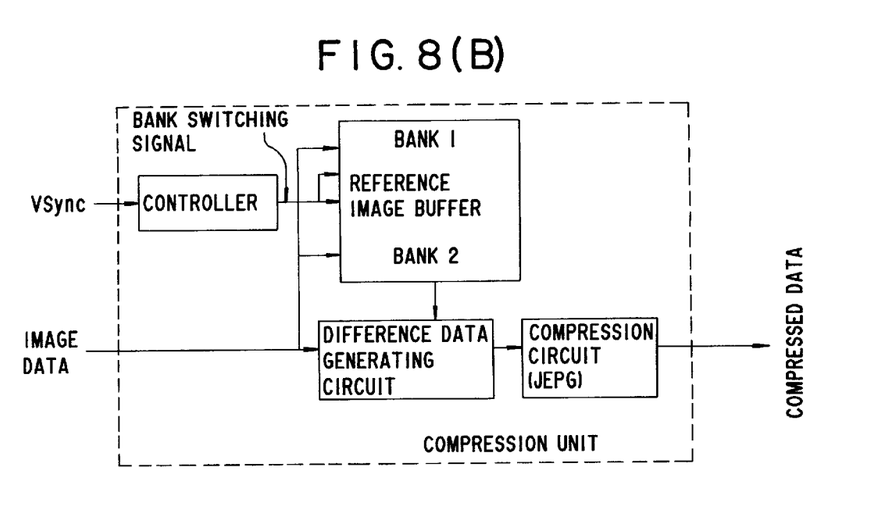

FIG. 8 (B) indicates a detailed construction of a compression unit. The compression unit comprises a controller, banks 1 and 2 which are image buffers of two image planes, a difference data generating circuit and a compression circuit.

The controller switches the banks 1 and 2 into the buffer for writing and the buffer for reading respectively by turns at the timing of Vsync. Namely, while storing the data in one bank, the controller reads out the data from the other bank.

Besides, the controller initializes the contents of each buffer assuming that the images are out at the beginning of the process. The controller incorporates the input image into the buffer for writing after the image is input. Then, the controller reads out the content of the images stored in the buffer for reading in accordance with the input to compress the difference, and leads the difference into the compression circuit.

The compression circuit continues compressing the transferred data until the images of one frame stored within the bank 22 are out. Hereupon, the output difference image will be the input image itself and it will be the difference image of the images which are adjacent to one another after that, since no data is stored in the images read out from the buffer for reading at first. Besides, it will be possible to realize the expansion if the identical process is followed reversely.

The above-mentioned operations of the compression unit will be described concretely by using FIG. 8. First of all, when an image #1 is input, the image #1 is stored in the bank 1 and is data-compressed. Then, when an image #2 is input, the image #1 is read out from the bank 1 and the difference between the image #2 and the image #1 is data-compressed while the image #2 is input into the bank 2. Further, when an image #3 is input, the image #2 is read out from the bank 2 and the difference between the image #3 and the image #2 is data-compressed while the image #3 is input into the bank 1.

(COMPRESSION PROCESSING SEQUENCE)

Figure 9:
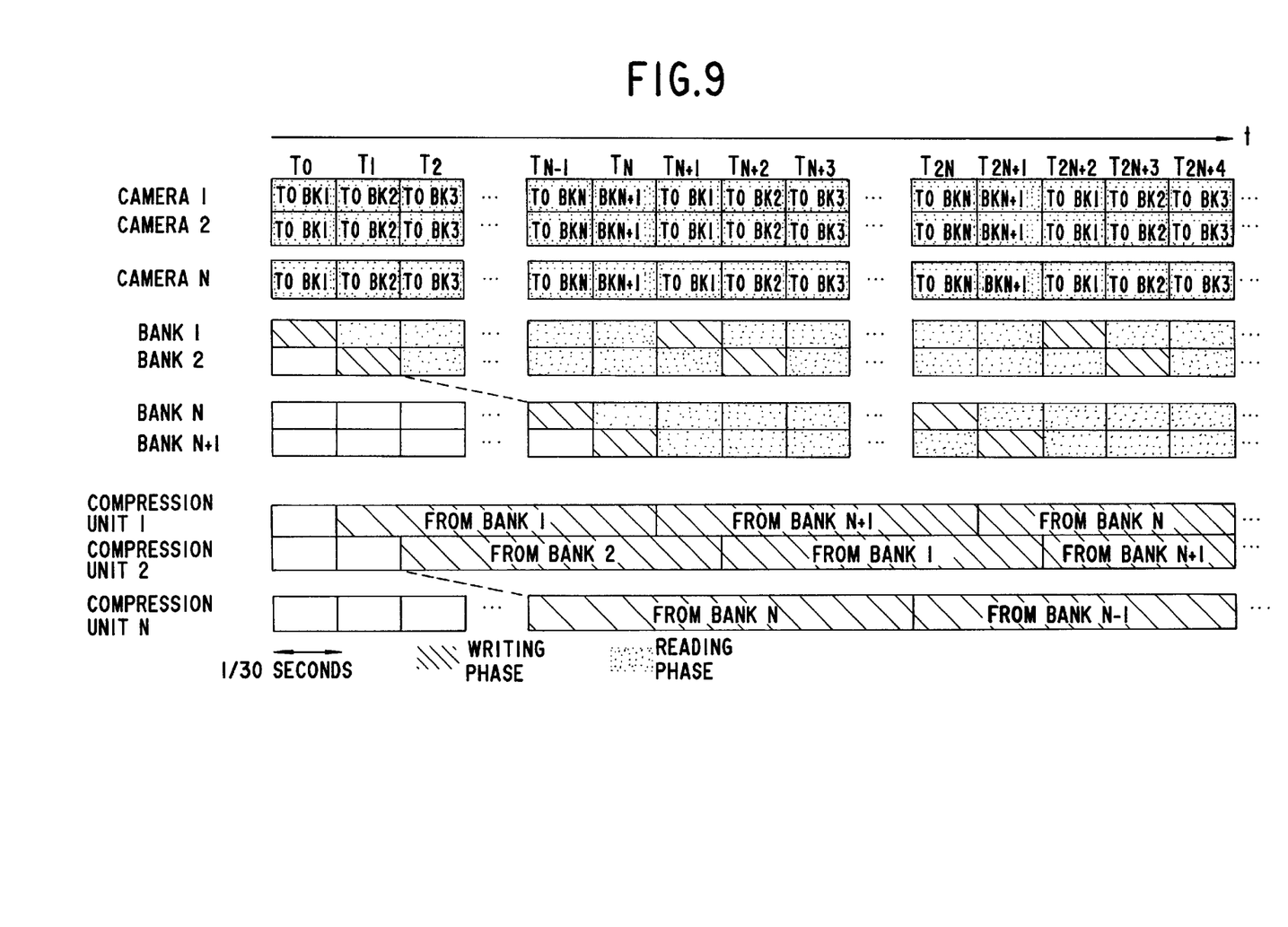
FIG. 9 is a processing sequence diagram (1) when data is compressed.
Figure 10:
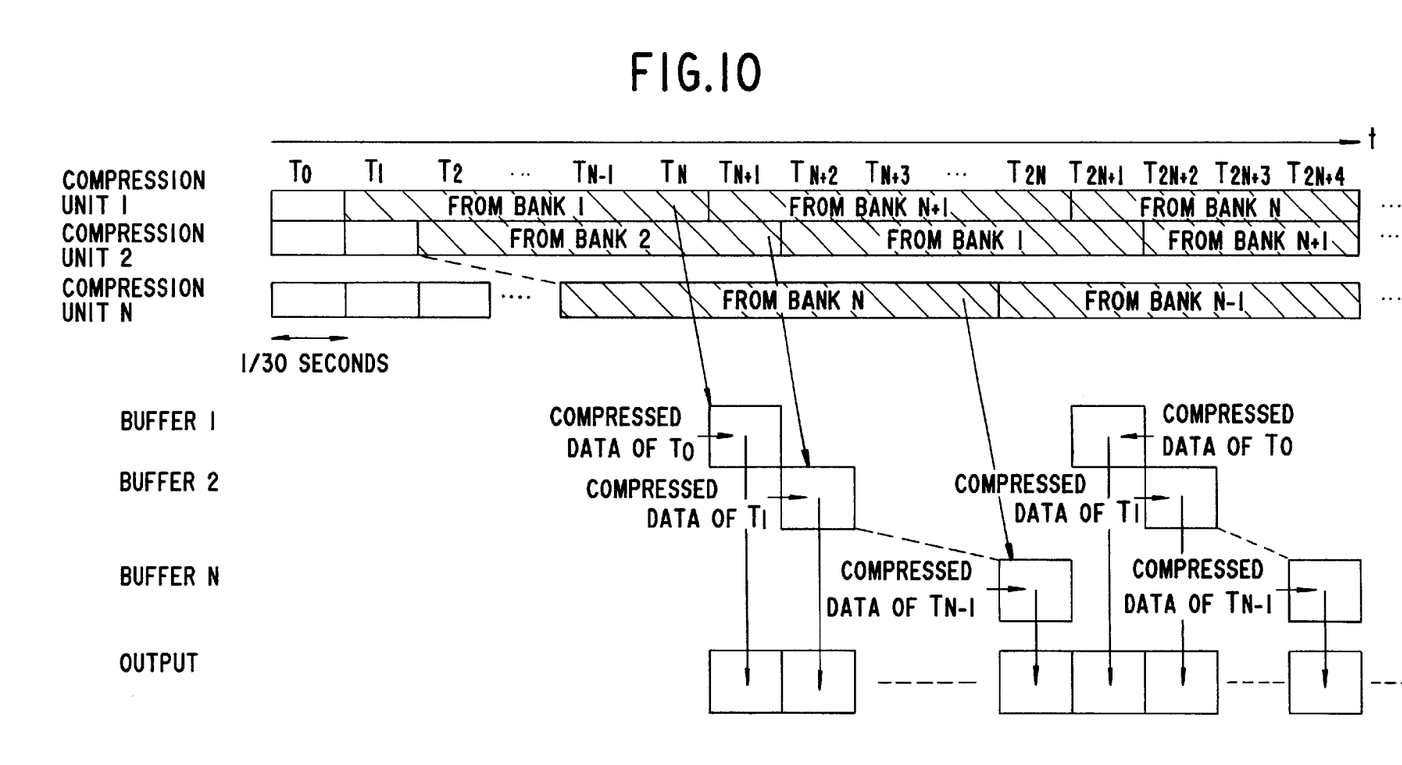
FIG. 10 is a processing sequence diagram (2) when data is compressed.

Then, the compression processing sequence of the first embodiment will be described by referring to FIG. 9 and FIG. 10. The cameras 1–N shown in FIG. 9 are equivalent to the cameras 11-1–11-N shown in FIG. 4. Besides, the banks 1-N+1 are equivalent to the banks 22-1–22-N+1 shown in FIG. 5 or FIG. 6. Further, the compression units 1–N are equivalent to the compression units 31-1–31-N shown in FIG. 4. Then, the buffers 1–N shown in FIG. 10 are equivalent to the buffers 33-1–33-N shown in FIG. 4.

First of all, the processing sequence of the cameras 1–N will be described by referring to FIG. 9.

The images read out from the cameras 1–N at the time $T_o$ are written into the bank (BK) 1. Then, the images read out from the cameras 1–N at the time $T_1$ are written into BK2. After that, the process for writing the images read out from the cameras 1–N at the time $T_m$ into the bank m+1 is continued until the time $T_{n-1}$, when it is assumed that m is an integral number. Then, the above-mentioned process is executed repeatedly beginning at the times $T_{n+1}$, $T_{2n+2}$ and . . .

Then, the processing sequence of the banks 1–N+1 will be described by referring to FIG. 9.

First of all, the images read out from the cameras 1–N at the time $T_o$ are written into the BK1 at the time $T_o$. Then, the images read out from the cameras 1–N at the time $T_1$ are written into the BK2 at the time $T_1$. After that, the process for writing the images read out from the cameras 1–N at the time $T_m$ into the BKm+1 at the time $T_m$ is continued until the time $T_1$, when it is assumed that m is an integral number. Then, the above-mentioned process is executed repeatedly beginning at the times $T_{n+1}$, $T_{2n+2}$, . . .

Besides, the image data stored in the cameras 1, 2 and . . . are read out from the bank 1 at the times $T_1$, $T_2$ and . . . Secondly, in the bank 2, the image data stored in the cameras 1, 2 and . . . are read out at the times $T_2$, $T_3$ and . . . Then, in the bank N+1, the image data stored in the cameras 1, 2 and . . . are read out at the times $T_{N+1}$, $T_{N+2}$ and . . . .

Then, the processing sequence of the compression units 1–N will be described by referring to FIG. 9.

First of all, in the compression unit 1, the data read out from the bank 1 are written in order to be compressed from the time $T_1$ to the time $T_n$. Then, the data read out from the bank 1 are compressed in order and the compression of the data is finished at the time $T_N$ Secondly, the data read out from the bank N+1 are written to be compressed from the time $T_{N+1}$ to the time $T_{2N}$. Then, the data read out from the bank N are written to be compressed beginning at the time $T_{2N+1}$.

Besides, in the compression unit 2, the data read out from the bank 2 are written from the time $T_2$ to the time $T_{N+1}$. Secondly, the data read out from the bank 1 are written from the time $T_{N+2}$ to the time $T_{2N+1}$. Then, the data read out from the bank N+1 are written beginning at the time $T_{2N+2}$.

Further, in the compression unit N, the data read out from the bank N are written from the time $T_{N-1}$ to the time $T_{2N-1}$ Secondly, the data read out from the bank N −1 are written beginning at the time $T_{2N}$.

Then, the processing sequence of the buffers 1–N will be described by referring to FIG. 10.

First of all, in the time $T_{N+1}$, the compressed data of the image data output from the cameras 1–N at the time $T_o$ are stored in the buffer 1. Secondly, in the time $T_{N+2}$, the compressed data of the image data output from the cameras 1–N at the time $T_1$, are stored in the buffer 2. Then, in the time $T_{2N}$, the compressed data of the image data outputted from the cameras 1–N at the time $T_{N-1}$, are stored in the buffer N. After that, the compressed data are written into the buffer N from the buffer 1 repeatedly. Then, the compressed data written into the buffers are outputted without delay. Namely, for instance, the compressed data written into the buffer 1 at the time $T_{N+1}$ are output at the time $T_{N+1}$.

THE SECOND EMBODIMENT

The Construction of the Second Embodiment

Figure 11A:
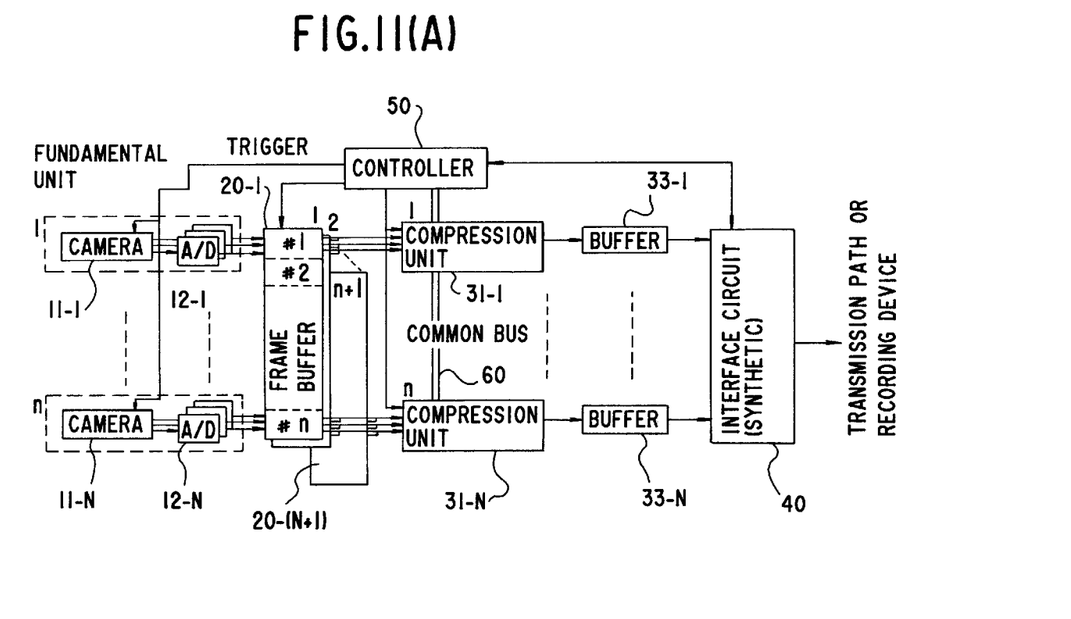
FIGS. 11(A) and 11(B) are construction diagrams of the second embodiment.
Figure 11B:
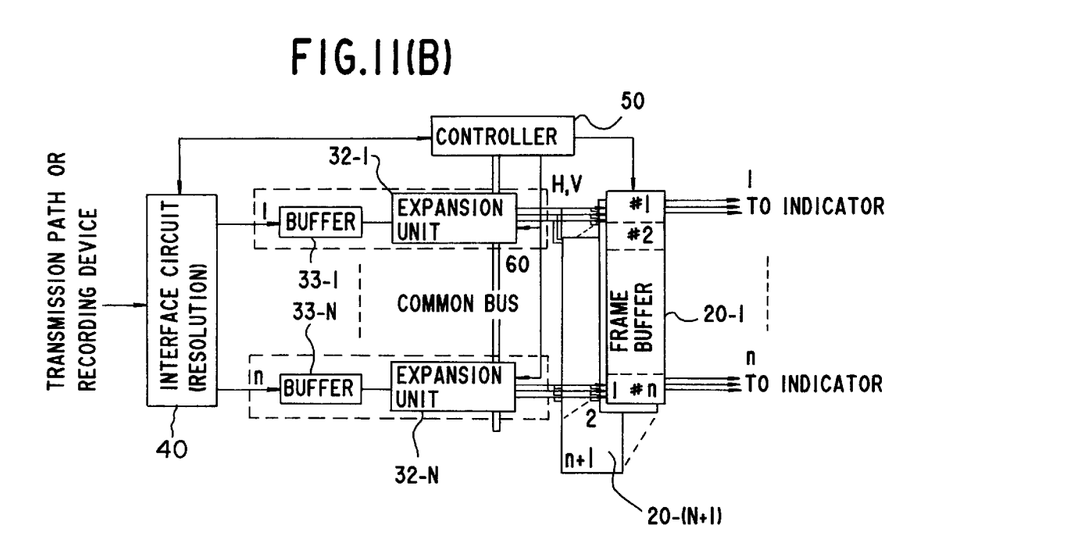

FIG. 11 is a construction diagram of the image processing system of the second embodiment. As shown in FIG. 11, the image processing system of the second embodiment is constructed in the same way as the image processing system of the first embodiment except that the common bus 60 is connected to the compression units 31-1–31-N from the controller 50, so only the constructions which are related to the common bus 60 will be described as follows.

[Controller 50]

The controller 50 provides each of the compression units 31-1–31-N with table data and parameters necessary for compressing the data through the common bus 60.

[Compression Unit 31]

The compression unit 31 executes the compression processing on the basis of the parameters which were received through the common bus 60.

[Connecting Construction of the Common Bus 60]

Figure 12:
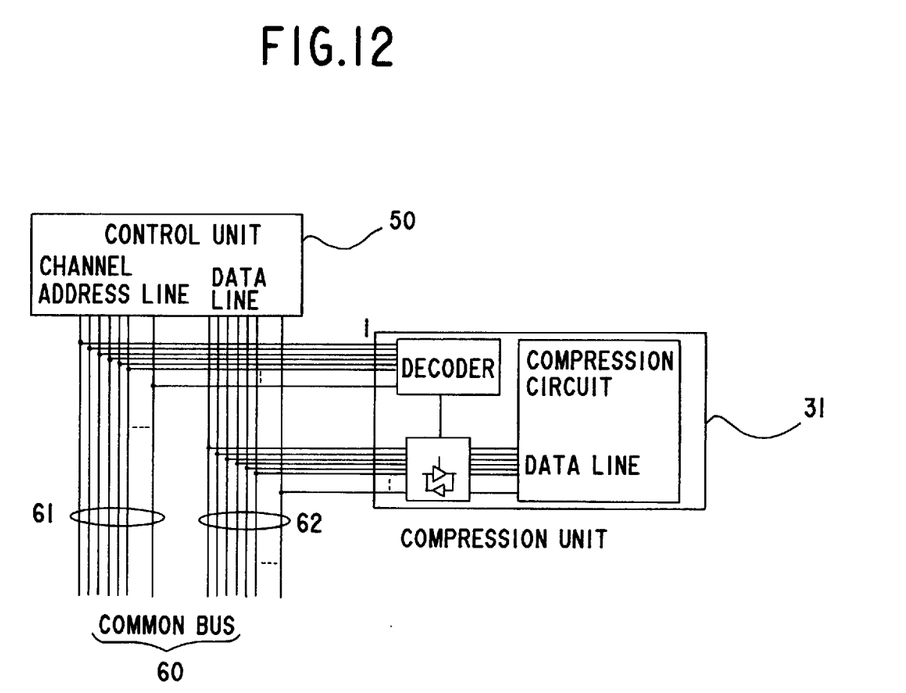
FIG. 12 is a diagram indicating a common bus between a compression unit and a controller.

FIG. 12 indicates a connecting construction of the common bus installed between the controller 50 and the compression units 31-1–31-N.

As shown in FIG. 12, the common bus 60 is composed of a channel address line 61 and a data line 62. Besides, the channel address line 61 is connected to the compression circuit within the same compression unit through a decoder installed within the compression units 31-1–31-N.

The decoder determines whether or not the information on the data signal line is for its compression circuit use and transfers the information to the compression circuit as occasion demands. For instance, the transferring of the data with a shake-hand by monitoring a status signal are exemplified as a method for giving and receiving the information.

[Other Constructions of the Second Embodiment]

Figure 13:
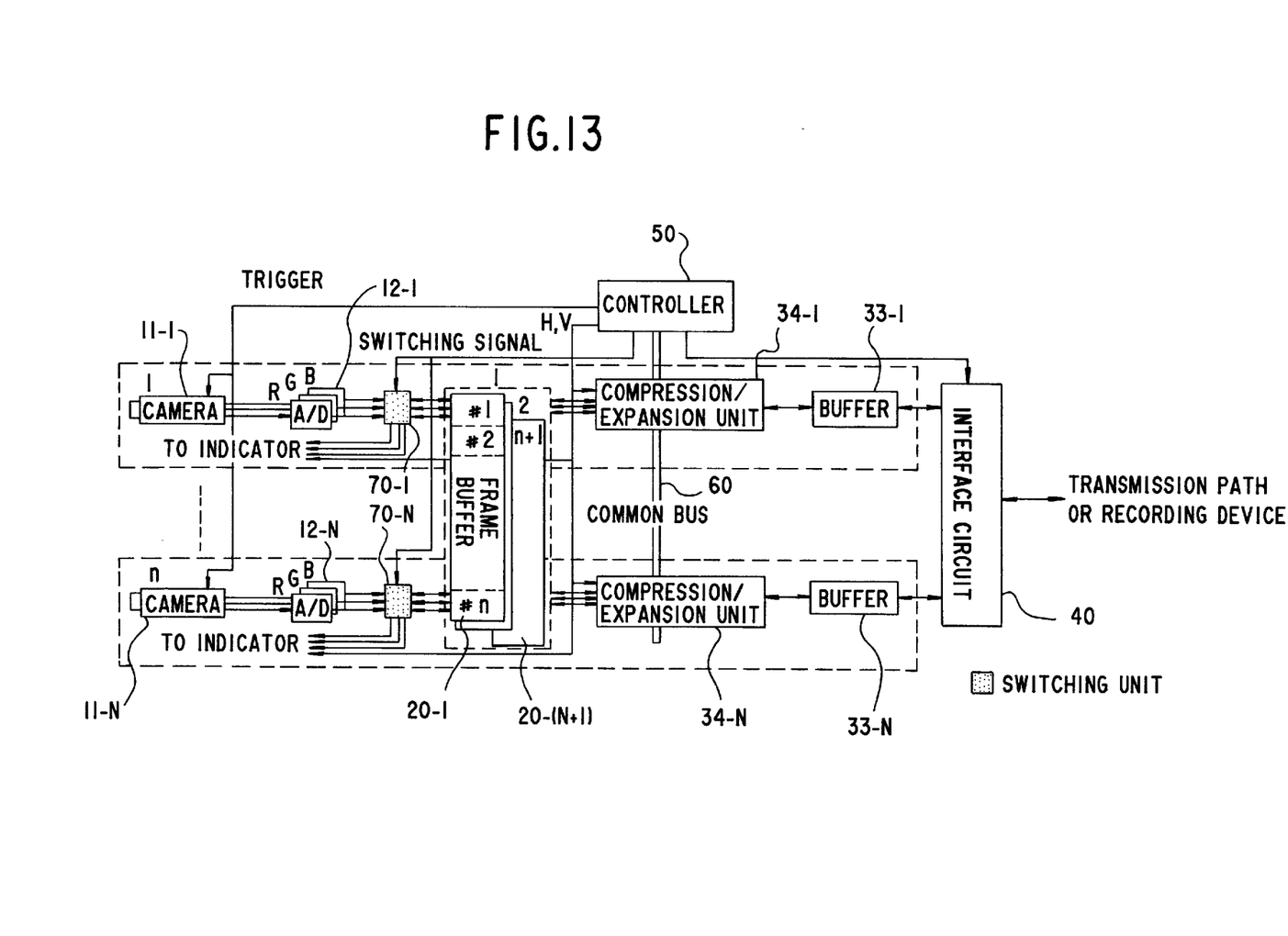
FIG. 13 is a construction diagram when the second embodiment is realized on the same chip.

It is also possible to make the constructions of the second embodiment when the data is compressed and when the data is expanded into one construction. The construction is shown in FIG. 13. At this moment, the switching units 70-1–70-N are installed between the A/D converters 12-1–12-N and the frame buffers 20-1–20-(N+1).

<Operations of the Second Embodiment>

Although the operations of the second embodiment are fundamentally the same as those of the first embodiment, the second embodiment has the following characteristics compared with the first embodiment. Namely, it is possible to control the error processing and the parameters of every kind uniformly and various functions can be realized only by changing the software and firmware of the controller 50, since the controller 50 controls the condition of the plurality of compression units 31-1–31-N in the lump.

What is claimed is:

1. An image processing system, comprising:

a control unit for outputting a synchronizing signal;

an input unit for inputting a plurality of images which consist of frames and represent views of an object from various directions respectively;

an image data storage unit for temporarily storing plural newest frames of each of the plurality of images input from said input unit by updating storing contents synchronizing with the synchronizing signal input from said control unit;

a data compression unit for compressing frames which are simultaneously stored into said image data storage unit and the plurality of images synchronizing with the synchronizing signal, therein generating a plurality of compression data successively; and an interface unit for multiplexing the plurality of compression data input from said data compression unit and outputting multiplexed data to an external device.

2. An image processing system according to claim 1, wherein said image data storage unit has a storage capacity of storing frames of a number larger than a number of the plurality of images by one for each of the plurality of images.

3. An image processing system according to claim 1, wherein said data compression unit consists of data compression unit elements of a number equal to a number of the plurality of the images, each of said data compression unit elements compresses a corresponding frame among frames which are simultaneously stored into said image data storage unit.

4. An image processing system according to claim 2, wherein said data compression unit consists of data compression unit elements of the number larger than the number of the plurality of images by one, each of said data compression unit elements compresses a corresponding frame among frames which are simultaneously stored into said image data storage unit.

5. An image processing system according to claim 1, wherein said data compression unit regards frames which were input from said input unit for the first time as reference image frames, and compresses difference between frames which are simultaneously input and the reference image frames, therein generating the plurality of compression data successively.

6. An image processing system according to claim 1, wherein said data compression unit compresses difference between two successive frames for each of the plurality of images, therein generating the plurality of compression data successively.

7. An image processing system, comprising:

a control unit for outputting a synchronizing signal;

an interface unit for inputting multiplexed data from an external device, and demultiplexing the multiplexed data into a plurality of compressed data;

a data expansion unit for expanding the plurality of compressed data demultiplexed by said interface unit synchronizing with the synchronizing signal, therein generating a plurality of expanded data successively; and an image data storage unit for temporarily storing plural newest sets of the plurality of expanded data generated in said data expansion unit by updating storing contents synchronizing with the synchronizing signal input from said control unit.

8. An image processing system according to claim 7, wherein said image data storage unit has a storage capacity of storing the plural newest sets of a number larger than a number of the plurality of expanded data by one.

9. An image processing system according to claim 7, wherein said data expansion unit regards the plurality of the compressed data input from said interface unit for the first time as reference image data, after that, generates the plurality of expanded data by adding the reference image data to the plurality of data obtained by decompressing the plurality of compressed data.

10. An image processing system according to claim 7, wherein said data expansion unit expands a difference image data of the image data input in time series from said interface unit and reference image data and sums up the image data which has been input just before and the expanded image data so as to generate the image data.

11. An image processing system according to claim 1, wherein said data compression unit includes:

a plurality of data compression unit elements each of which is capable of compressing a frame;

a common bus which is connected to the plurality of said data compression unit elements; and a controller for selecting one of the plurality of said data compression unit elements and outputting a data parameter used for compressing a frame.

12. An image processing system according to claim 7, wherein said data expansion unit includes:

a plurality of data expansion unit elements each of which is capable of expanding a frame;

a common bus which is connected to the plurality of said data expansion unit elements; and a controller for selecting one of the plurality of said data expansion unit elements and outputting a data expanding a frame.

13. An image processing system, comprising:

a control unit for outputting a synchronizing signal;

an input unit for inputting a plurality of images which consist of frames and represent views of an object from various directions respectively;

an image data storage unit for temporarily storing plural sets of a plurality of image data;

a plurality of data compression/expansions units capable of compressing a plurality of input image data and expanding a plurality of compressed data;

an interface unit capable of multiplexing the plurality of compression data input from said data compression/expansion units and outputting multiplexed data to an external device, and capable of demultiplexing multiplexed data input from the external device into a plurality of compressed data and outputting the plurality of the compressed data to said data compression/expansion units;

a common bus which is connected to said plurality of said data compression/expansion units; and a controller for controlling said data compression/expansion units using said common bus and controlling said interface unit so that multiplexed data corresponding to images input to said input unit is output from said interface unit, or images corresponding to multiplexed data input to said interface unit are stored in said image data storage unit.

* * * * *

UNITED STATES PATENT AND TRADEMARK OFFICE
CERTIFICATE OF CORRECTION

PATENT NO.   :   5,774,589

DATED        :   June 30, 1998

INVENTOR(S)  :   Aritake et al.

It is certified that error appears in the above-identified patent and that said Letters Patent is hereby corrected as shown below:

On title page,

Item [75], line 2, delete "Satoshi Maede" insert therefor

-- Satoshi Maeda --

Signed and Sealed this

Sixth Day of October, 1998

Attest:

BRUCE LEHMAN

Attesting Officer

Commissioner of Patents and Trademarks